United States Patent [19]

Kawamura

[11] Patent Number: 5,406,797
[45] Date of Patent: Apr. 18, 1995

[54] DRIVE SYSTEM FOR TURBOCHARGER WITH ROTARY ELECTRIC MACHINE

[75] Inventor: Hideo Kawamura, Samukawa, Japan

[73] Assignee: Isuzu Motors Limited, Tokyo, Japan

[21] Appl. No.: 123,199

[22] Filed: Sep. 20, 1993

Related U.S. Application Data

[63] Continuation of Ser. No. 995,957, Dec. 23, 1992, abandoned, which is a continuation of Ser. No. 884,454, May 14, 1992, abandoned, which is a continuation of Ser. No. 681,652, Apr. 8, 1991, abandoned, which is a continuation of Ser. No. 367,256, Jun. 16, 1989, abandoned.

[30] Foreign Application Priority Data

Jun. 29, 1988 [JP] Japan ................................ 63-161772

[51] Int. Cl.⁶ ............................................. F02B 33/44
[52] U.S. Cl. ................................. 60/608; 290/52
[58] Field of Search .................. 60/607, 608; 290/52

[56] References Cited

U.S. PATENT DOCUMENTS

| | | | |
|---|---|---|---|
| 2,710,521 | 6/1955 | Nettel | 60/608 |
| 4,680,933 | 7/1987 | Bozung et al. | 60/608 |
| 4,745,754 | 5/1988 | Kawamura | 60/597 X |
| 4,757,686 | 7/1988 | Kawamura et al. | 60/608 |

FOREIGN PATENT DOCUMENTS

| | | | |
|---|---|---|---|
| 128935 | 7/1985 | Japan | 60/608 |
| 513971 | 10/1939 | United Kingdom | 60/607 |
| 800263 | 8/1958 | United Kingdom | 60/608 |

*Primary Examiner*—Richard A. Bertsch
*Assistant Examiner*—Charles G. Freay
*Attorney, Agent, or Firm*—Staas & Halsey

[57] ABSTRACT

A system for driving a turbocharger installed in an internal combustion engine and combined with a rotary electric machine which is mounted on a rotatable shaft of the turbocharger, includes a generator drivable by an output power of the engine. When the rotary electric machine is driven by an electric motor depending on an operating condition of the engine, electric power generated by the generator is supplied to the rotary electric machine.

2 Claims, 2 Drawing Sheets

DRIVE SYSTEM FOR TURBOCHARGER WITH ROTARY ELECTRIC MACHINE

This application is a continuation of application Ser. No. 07/995,957, filed Dec. 23, 1992, now abandoned, which is a continuation of application Ser. No. 07/884,454, filed May 14, 1992, now abandoned, which is a continuation of application Ser. No. 07/681,652, filed Apr. 8, 1991, now abandoned, which is a continuation of application Ser. No. 07/367,256, filed Jun. 16, 1989, now abandoned.

BACKGROUND OF THE INVENTION

1. Field of the Invention

The present invention relates to a system for driving a turbocharger installed in an internal combustion engine mounted on a motor vehicle such as an automobile, and more particularly to a drive system for a turbocharger combined with a rotary electric machine which can operate as an electric motor depending on operating conditions of the internal combustion engine.

2. Description of the Prior Art

Turbochargers which are now in widespread use have a compressor mounted on the shaft of a turbine that is driven by the energy of exhaust gases emitted from an engine. The compressor compresses intake air to supercharge the engine for increasing the output power of the engine. Various proposals have been made to install a motor/generator on the rotatable shaft of the turbocharger and control the motor/generator depending on operating conditions of the engine.

The applicant has proposed, as one of such proposals, a turbocharger for use with an internal combustion engine, the turbocharger being combined with a motor/generator. When the engine operates at a low speed under a high load, electric power is supplied to the motor/generator to operate the motor/generator as a motor to assist the turbocharger in supercharging the engine (see Japanese Laid-Open Patent Publication No. 60-195329).

According to the proposed turbocharger, the electric power is supplied from a battery to the motor/generator for assisting the turbocharger in supercharging the engine. When the motor vehicle runs up a long uphill road, the electric power stored in the battery is greatly reduced or used up, and the battery can no longer be used as an electric power supply on the motor vehicle.

SUMMARY OF THE INVENTION

It it an object of the present invention to provide a system for driving a turbocharger installed in an internal combustion engine and combined with a rotary electric machine, the system including a generator which, when the rotary electric machine operates as an electric motor to assist in rotating the turbocharger, is drivable by the engine to generate electric power that is supplied to the rotary electric machine.

According to the present invention, there is provided a system for driving a turbocharger installed in an internal combustion engine and combined with a rotary electric machine, the system comprising a rotary electric machine mounted on a rotatable shaft of the turbocharger, a generator drivable by an output power of the engine, means for driving the rotary electric machine as an electric motor depending on an operating condition of the engine, and means for supplying electric power generated by the generator to the rotary electric machine when the rotary electric machine is driven as the electric motor.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
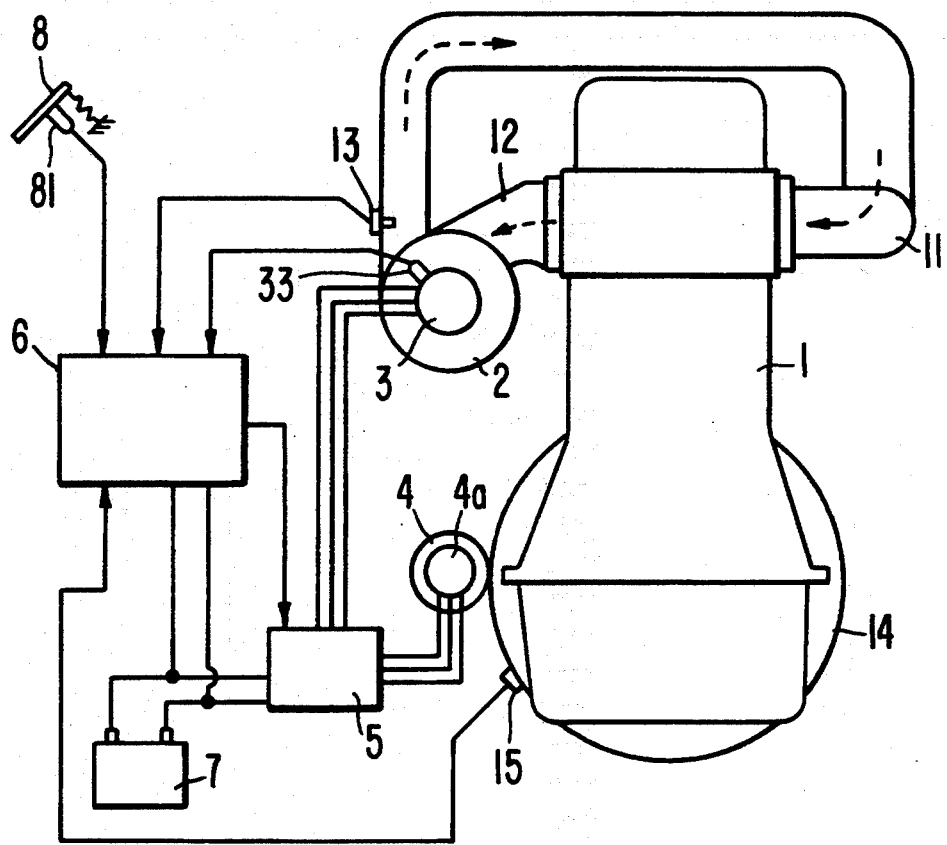
FIG. 1 is a block diagram of a drive system for a turbocharger with a rotary electric machine according to the present invention.
Figure 2:
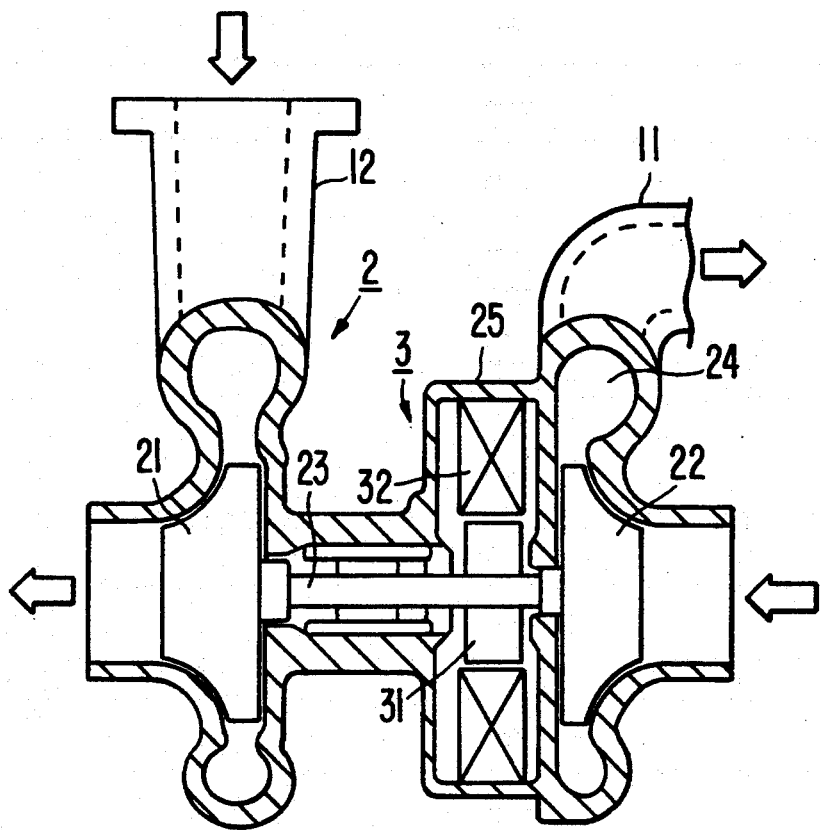
FIG. 2 is a cross-sectional view of the turbocharger according to the present invention.

As shown in FIGS. 1 and 2, an internal combustion engine 1 mounted on a motor vehicle such as an automobile is operated by the combustion energy of air drawn through an intake pipe 11 and fuel supplied to the engine to drive the motor vehicle. Exhaust gases from the engine 1 are supplied through an exhaust pipe 12 to a turbocharger 2 to rotate a turbine 21 thereof. The turbocharger 2 also has a compressor 22 coupled to a shaft 23 joined to the turbine 21 and rotatable by the torque of the turbine 21 rotated by the exhaust energy for compressing air. The compressed air is then supplied from a scroll 24 through the intake pipe 11 to the engine 1. The boost pressure of the turbocharger 2 is detected by a boost sensor 13 disposed in the intake pipe 11.

A rotary electric machine 3 comprises a rotor 31 directly coupled to the shaft 23, and a stator 32 fixed to the inner wall surface of a housing 25 of the turbocharger 2, the rotor 31 being composed of a squirrel-cage coil, for example. The rotary electric machine 3 is therefore in the form of an induction rotary electric machine. When the drive power of the turbine 21 driven by the exhaust energy is not large enough to enable the compressor 22 to supercharge the engine 1 sufficiently, the rotary electric machine 3 is supplied with electric power to assist the compressor 22 in supercharging the engine 1. The rotational speed of the compressor 22, for example, is detected by a turbine speed sensor 33 to detect the rotational speed of the turbocharger 2. A detected speed signal is applied by the turbine speed sensor 33 to a controller (described later).

An electric generator 4 which is drivable by the torque of the engine 1 is held in engagement with a flywheel 14 of the engine 1 to receive the output power from the engine 1. The electric generator 4 comprises an AC generator with a permanent magnet 4a as its rotor, and supplies generated electric power to an inverter 5. The generator 4 has a stator winding constructed such that the output voltage produced by the stator winding in relation to the permanent magnet rotor will be sufficiently higher than the counter-electromotive forces induced when the rotor 31 of the rotary electric machine 3 rotates with respect to the stator 32.

An engine speed sensor 15 detects the rotational speed of the flywheel 14 to detect the rotational speed of the engine 1.

An inverter 5 converts the AC electric power from the generator 4 to an AC output having a predetermined frequency for driving the rotary electric machine 3. The inverter 5 comprises a rectifier for rectifying the AC electric power from the generator 4 to DC electric power, and a power device for converting the DC electric power to the AC electric power having the predetermined frequency. A control command for achieving the predetermined frequency is supplied from a controller 6.

The controller 6 and the inverter 5 are supplied with electric power from a battery 7. In the inverter 5, only the power device is supplied with control electric power from the battery 7. The rotary electric machine 3 is driven by electric power which is not supplied from the battery 7 but from the generator 4.

An accelerator pedal 8 is operated by the driver of the motor vehicle to control the rate of fuel to be supplied to the engine 1.

The depth to which the accelerator pedal 8 is depressed is detected by an accelerator pedal movement sensor 81 which applies a detected signal to the controller 6.

The controller 6 comprises a microcomputer including a central processing unit for carrying out arithmetic operations, various memories for storing the results of arithmetic operations and a control program, and input/output ports. When detected signals are applied from the boost sensor 13, the engine speed sensor 15, the turbine speed sensor 33, and the accelerator pedal movement sensor 81 to the controller 6, the controller effects, according to the control program, arithmetic operations on the supplied signals and supplies a control command to the inverter 5 for converting the DC electric power to AC electric power having a predetermined frequency.

The drive system of the present invention thus constructed will operate as follows:

When the engine 1 rotates at a low speed under a high load as when the motor vehicle starts running up a steep road, the driver of the motor vehicle depresses the accelerator pedal 8 to a greater depth. During an initial period of such uphill running, since the engine speed is not quickly increased and hence the exhaust energy for driving the turbine 21 is small, the turbocharger 2 cannot supercharge the engine 1 sufficiently. Such a condition is detected by the controller 6 based on signals from the accelerator movement sensor 81, the engine speed sensor 15, and the turbine speed sensor 33. Then, the controller 6 generates and applies a control command to the inverter 5 to increase the frequency of AC power to be supplied to the rotary electric machine 3 and to convert the rectified DC electric power to the AC electric power of the predetermined frequency for energizing the rotary electric machine 3.

In response to the control command, the frequency of the AC electric power supplied to the rotary electric machine 3 is increased. The rotary electric machine 3 is operated to increase the supercharging capability of the compressor 22. The engine 1 is now supplied with compressed air to increase its output power.

Therefore, the torque of the engine 1 can be increased when it rotates at a low speed under a high load while the motor vehicle loaded with a cargo is running up a steep road.

In the above embodiment, because the output voltage of the generator 4 having the permanent magnet rotor is sufficiently high, any means for increasing the voltage of the AC electric power to be supplied to the rotary electric machine 3 serving as an induction motor is not required, but only a means for increasing the frequency of the AC electric power to be supplied to the rotary electric machine 3 is required, in the conversion by the inverter 5 of the electric power from the generator 4 to the AC electric power for energizing the rotary electric machine 3.

With the present invention, as described above, the electric power generated by the generator driven by the output power of the engine is supplied to the motor/generator or the rotary electric machine to operate the latter as an electric motor, but electric power from the battery is not employed to drive the motor/generator. Therefore, even if the engine rotates at a low speed under a high load over a long period of time, sufficient compressed air can be supplied to the engine from the turbocharger, so that the torque generated by the engine can be increased and the electric energy stored in the battery is not excessively reduced.

Furthermore, since the stator winding of the generator driven by the engine is constructed such that the output voltage generated thereby is sufficiently higher than the voltage supplied to the motor/generator, any means for increasing the voltage in the conversion of the generated electric power is dispensed with.

Although a certain preferred embodiment has been shown and described, it should be understood that many changes and modifications may be made therein without departing from the scope of the appended claims.

What is claimed is:

1. A system for driving a turbocharger installed in an internal combustion engine mounted on a motor vehicle and combined with a rotary electric machine, said turbocharger having a turbine section driven by exhaust energy of the engine and a compressor section, said system comprising:
   an AC induction rotary electric machine operable as a motor/generator mounted on a rotatable shaft of the turbocharger;
   an AC magnet generator connected to an output shaft of the engine and drivable by an output power of the engine, said AC magnet generator having a stator winding configured such that the voltage generated at least in part as a function of said stator winding is higher than the voltage of counter-electromotive forces generated in a stator of said AC induction rotary electric machine when the AC magnet generator is driven by the engine and the AC induction rotary electric machine operates as an electric motor;
   means for detecting when a drive power of the turbine section driven by the exhaust energy is not large enough to enable the compressor section to supercharge the engine sufficiently; and
   means for supplying electric power to said rotary electric machine, said supplying means having a rectifier for converting AC electric power generated by said magnet generator to DC electric power, and an inverter for converting the rectified DC power to AC electric power having a predetermined frequency and supplying the AC electric power to said induction rotary electric machine when said electric power supplying means receives a power supplying signal from said detecting means.

2. A drive system for a turbocharger on an engine, comprising:
   rotary electric machine means, mounted on a rotatable shaft of the turbocharger, operable as a motor/generator depending on engine conditions, the rotary electric machine means having a power consumption rate;

D.C. generator means drivable by an output power of the engine to generate D.C. power, the D.C. generator means having a power production rate which is at least equal to the power consumption rate of the rotary electric machine means;

frequency varying means for converting the D.C. power generated by the D.C. generator means to A.C. power, for controlling the frequency of the A.C. power based upon a control signal and for supplying the A.C. power to the rotary electric machine means; and control means for producing the control signal in response to engine conditions.

* * * * *

UNITED STATES PATENT AND TRADEMARK OFFICE
CERTIFICATE OF CORRECTION

PATENT NO. : 5,406,797
DATED : April 18, 1995
INVENTOR(S) : Kawamura

It is certified that error appears in the above-indentified patent and that said Letters Patent is hereby corrected as shown below:

Col. 4, between lines 48 and 49, insert --means for detecting an engine condition--.

Col. 4, line 49, delete "detecting" and insert --determining--.

Col. 4, line 52, after "sufficiently" insert --based upon a signal received from the detecting means--.

Col. 4, line 62, delete "detecting" and insert --determining--

Col. 6, line 5, delete "and".

Col. 6, between lines 5 and 6, insert --sensing means for monitoring an engine condition and producing an engine condition signal; and--.

UNITED STATES PATENT AND TRADEMARK OFFICE
CERTIFICATE OF CORRECTION

PATENT NO. : 5,406,797
DATED : April 18, 1995
INVENTOR(S) : Kawamura

It is certified that error appears in the above-indentified patent and that said Letters Patent is hereby corrected as shown below:

Col. 6, line 7, delete "conditions" and insert --condition signal--.

Signed and Sealed this

Twenty-fourth Day of October, 1995

Attest:

BRUCE LEHMAN

Attesting Officer  Commissioner of Patents and Trademarks